Nov. 13, 1951   O. J. EISELE   2,574,819
AUTOMATIC VARIABLE SPEED AND REVERSE HYDRAULIC TRANSMISSION
Filed July 2, 1947   4 Sheets-Sheet 1
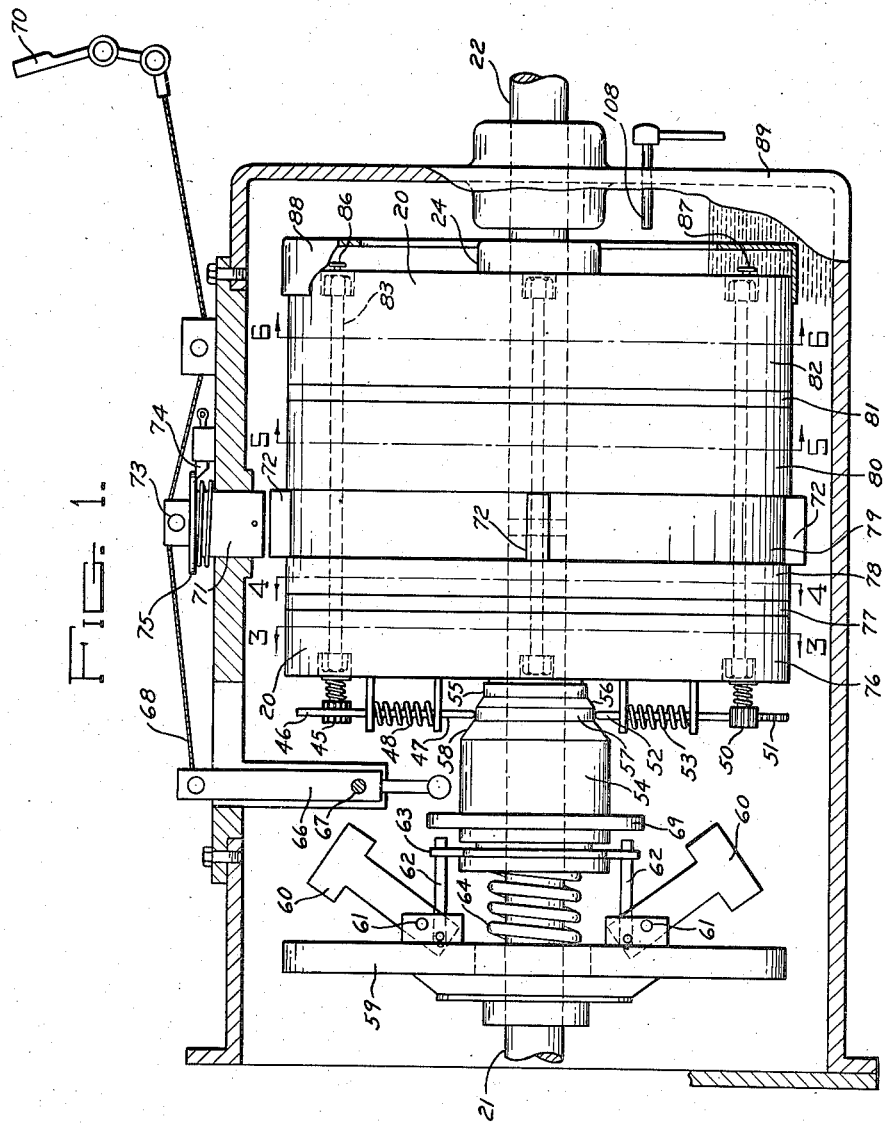
Otto J. Eisele
INVENTOR.
BY *Philip S. M'Kean,*
ATTORNEY.

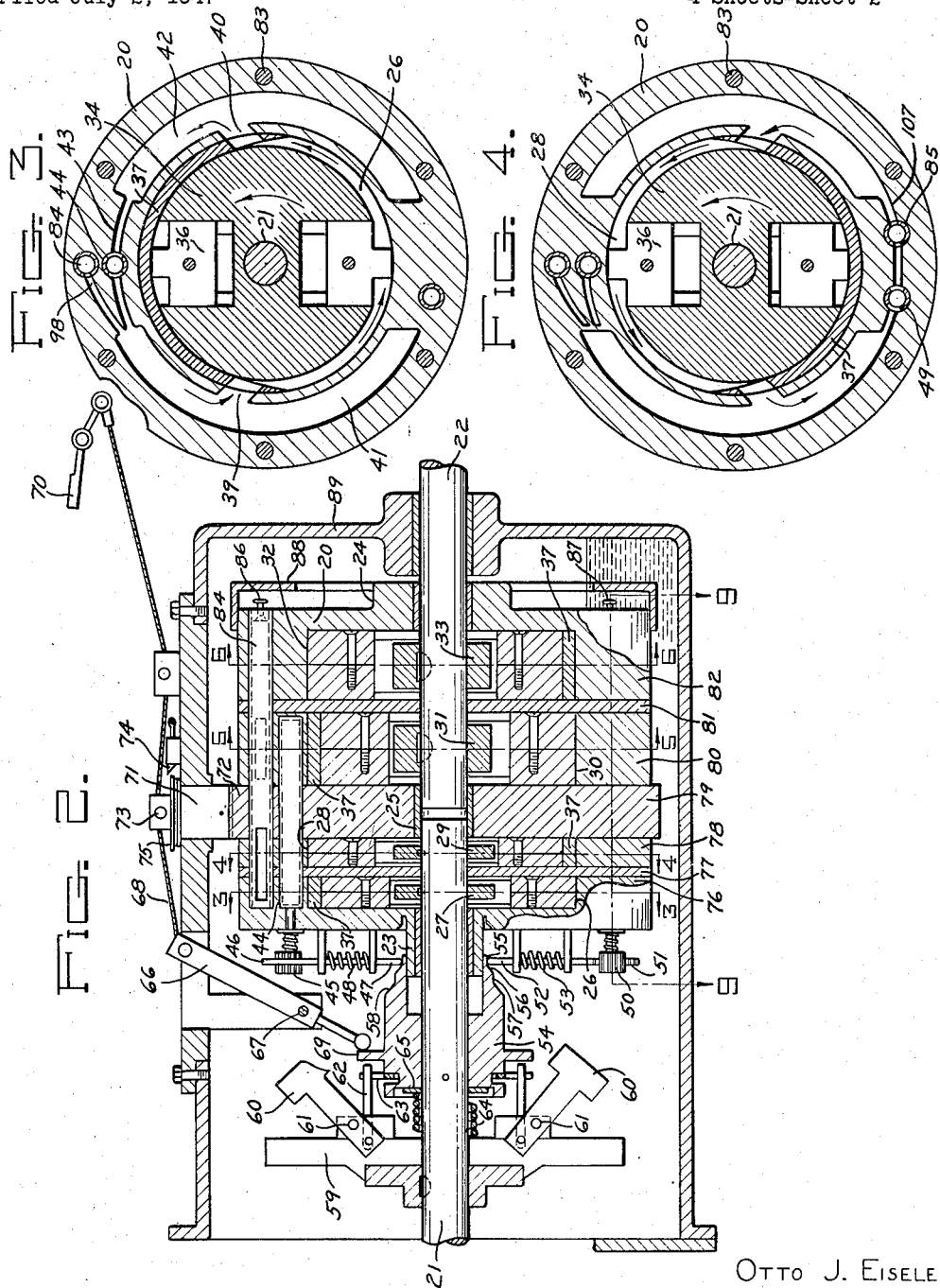

Nov. 13, 1951          O. J. EISELE          2,574,819
AUTOMATIC VARIABLE SPEED AND REVERSE HYDRAULIC TRANSMISSION
Filed July 2, 1947          4 Sheets-Sheet 3
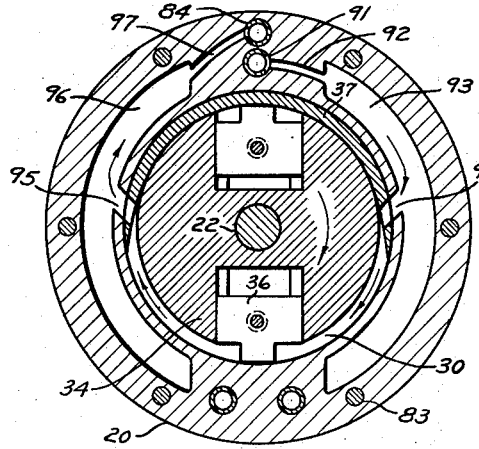
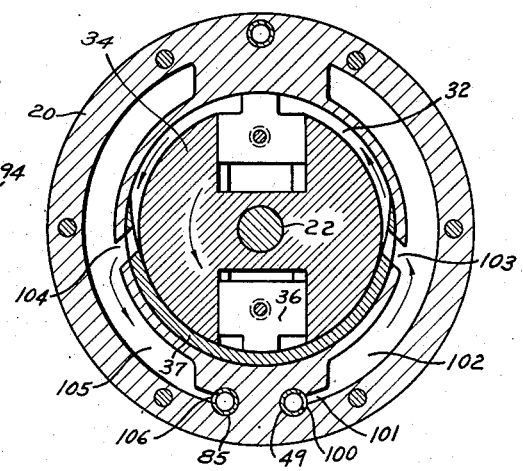
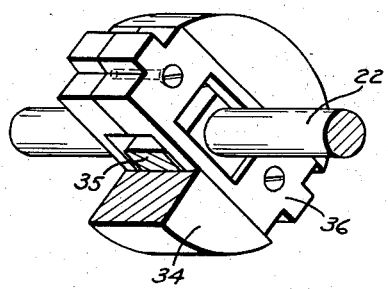
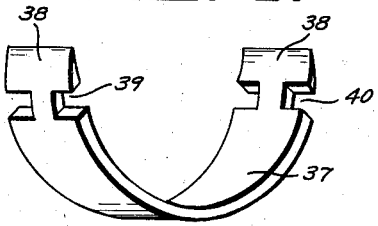
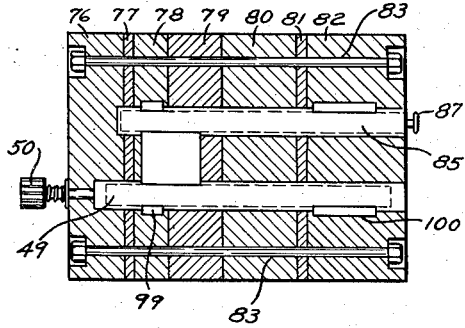
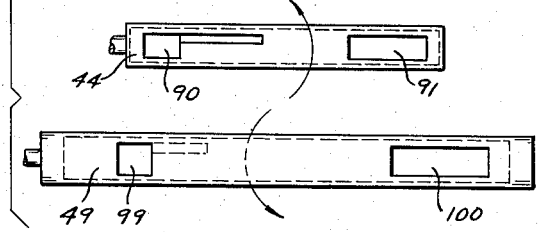
OTTO J. EISELE
INVENTOR.
BY
ATTORNEY.

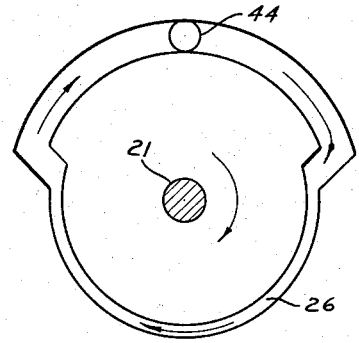
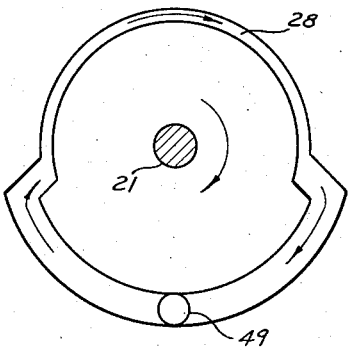
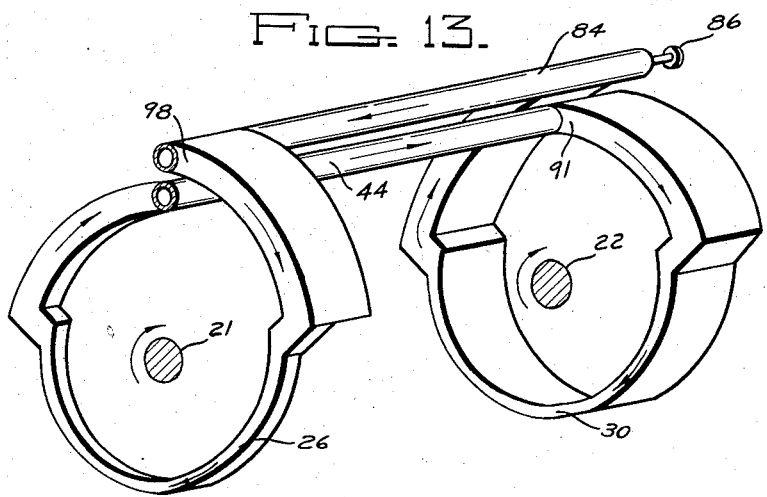
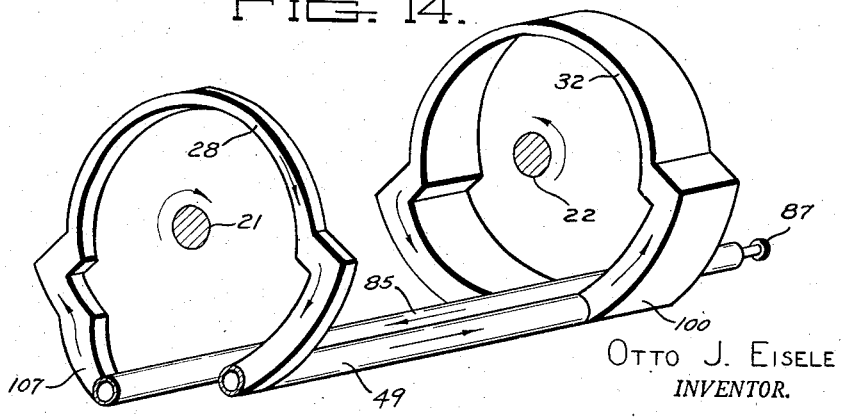

Patented Nov. 13, 1951

2,574,819

UNITED STATES PATENT OFFICE 2,574,819

AUTOMATIC VARIABLE-SPEED AND REVERSE HYDRAULIC TRANSMISSION

Otto J. Eisele, New York, N. Y.

Application July 2, 1947, Serial No. 758,685

17 Claims. (Cl. 60—53)

The invention here disclosed relates to what are generally known as hydraulic transmissions.

Objects of the invention are to provide a unitary form of mechanism which may be introduced between the power source and driven parts to provide forward and reverse drive and to automatically effect progressive forward speed as the power is applied and optional reverse drive, as required.

Particular objects of the invention are to accomplish such results in a practical, rugged, compact and relatively simple, small size structure.

Special objects of the invention are to accomplish the results sought in a balanced, smooth running, readily controlled mechanical structure.

Other desirable objects and the novel features through which the purposes of the invention are attained are set forth or will appear in the course of the following specification.

The drawings accompanying and forming part of the specification illustrates one practical commercial embodiment of the invention. Structure, however, may be modified and changed, all within the true intent of the invention as hereinafter described and particularly claimed.

Fig. 1 in the drawings is a part sectional side elevation of a unit constituting one embodiment of the invention;

Fig. 2 is a generally central vertical sectional view of the structure appearing in Fig. 1;

Figs. 3, 4, 5 and 6 are cross secctional views of the power transmission unit as on substantially the planes of lines 3—3, 4—4, 5—5 and 6—6, respectively, of Figs. 1 and 2;

Fig. 7 is a perspective view of a rotor and sliding piston combination constituting the rotary element of one of the pump or motor units, in this partcular illustration, the forward motor unit;

Fig. 8 is a perspective view of one of the ported cams for cooperation with the rotary unit;

Fig. 9 is a cross sectional detail of the casing on substantially the plane of line 9—9 of Fig. 2, showing in particular the tubular reversing valve and transfer tube associated therewith;

Fig. 10 is a detail view illustrating the porting arrangement of the forward and reverse control valves;

Fig. 11 is a diagrammatic view depicting the fluid flow circuit of the forward drive pump unit in idling or neutral operation;

Fig. 12 is a corresponding view for the reverse drive pump unit in neutral, idling operation;

Fig. 13 is a diagrammatic view illustrating the fluid circuit for forward drive;

Fig. 14 is a similar view illustrating the fluid circuit for reverse drive.

The present invention is based, to some extent, upon the form of mechanical clutch disclosed in Patent No. 2,418,292 of April 1, 1947, and involving hydraulic pump and motor units within a casing 20 rotatably mounted on adjoining ends of coaxial motor driven and power take-off shafts 21, 22, respectively.

Fig. 2 shows this casing as a cylindrical structure having end hubs 23, 24, journaled on shaft sections 21, 22, and carrying an intermediate bearing 25 piloting the adjoining ends of such sections.

The power end of the casing contains a generally cylindrical pump chamber 26 for the forward drive rotor or impeller 27, a substantially cylindrical chamber 28 for the reverse drive pump rotor or impeller 29, and the rearward or driven end of the casing contains a generally cylindrical chamber 30 for the forward drive impeller 31, and in back of that a like chamber 32 for the reverse drive impeller 33.

The four rotors mentioned may be all alike and similar to those disclosed in the patent mentioned, comprising segments 34, Fig. 7, spaced by a reduced bridge portion 35 keyed on the shaft to which it belongs and having between them a transversely guided sliding piston 36 coacting at its sides and ends with the side and circumferential walls of the enclosing pump or motor chamber.

Also, as in the patent identified, there is a cam 37 on the peripheral wall of the chamber for shifting the sliding piston of the rotor back and forth, having tapered ends 38 feathered down to the generally cylindrical periphery of the chamber, but in the present instance the side edges of the cams are notched near the tapered ends to form ports 39, 40.

As shown in the cross sectional view, Fig. 3, the ports 39 at one end of the cam in the first pump chamber, 26, open to an arcuate chamber 41 partly surrounding the pump chamber, and ports 40 at the opposite end of the cam open to a similar arcuate chamber, 42, which two outside chambers or channels are connected by a passage 43 controlled by a tubular, rotatably adjustable ported valve 44.

The end of valve 44, as shown in Figs. 1 and 2, carries a pinion 45 engaged by a rack 46 on a radial push rod 47 thrust inwardly or toward the shaft axis by spring 48.

This rotary valve 44 controls flow for the forward drive pump impeller and receiving motor elements.

Similarly, a tubular rotary valve 49 equipped with pinion 50, engaged by rack 51 of radial push rod 52, regulated by spring 53, controls flow for the reverse drive pump and motor impeller units.

An appropriately contoured clutch collar or sleeve 54 controls adjustment of the rack rods 47 and 52 and hence the setting of the rotary valves 44 and 49.

This valve adjusting or setting sleeve is shown as having a diameter 55 of least size at the inner end of the same for allowing the push rods under impulse of springs 48, 53, to turn the valves to the reverse position, then an incline or bevel 56 to a larger diameter shoulder 57 for setting the valves in a neutral position and a bevel 58 extending from there to a maximum diameter for projecting the push rods to turn the valves from low to the full forward drive position.

For effecting automatic forward drive with speeding of the engine from a normal or neutral idling position, there is provided in the present disclosure, an automatic centrifugal governor 59 keyed on the motor shaft and carrying centrifugal weights 60 pivoted at 61 and connected by links 62 with a collar 63 for thrusting the valve controlling sleeve toward the casing 20.

A spring 64 yieldably supports an abutment washer 65 on the power shaft 12 in back of the speed control sleeve 54, normally preventing said sleeve being shifted, to the left in Figs. 1 and 2, far enough to carry the reverse drive shoulder 55 under the valve turning rods 47, 52.

To effect movement of the valve control sleeve into full reverse position, a lever 66 is shown pivoted at 67 adapted to be pulled by a cable 68 to engage a flange 69 on the outer end of sleeve 54 to force it outward against spring plate 65 sufficiently for the rack rods 47, 52, to track on the lower or reduced diameter 55.

The reversing cable 68 is shown as operable by a foot pedal 70.

Operation of the reverse drive pedal 70 is utilized in the present disclosure also to shift a spring withdrawn stop plunger 71 inwardly into holding engagement with abutment teeth or lugs 72 on the rim of the casing 20, said cable over a pulley or roller 73 on the outer end of the stop plunger for this purpose.

This stop plunger may be secured in the out position as by means of a latch 74 engageable behind a flange 75 on the outer end of the plunger. Suitable means such as a reversing lever may be provided for withdrawing the latch when it is desired to go into reverse.

By locking out the stop plunger 71 under normal running conditions, by means of latch 74, the foot pedal 70 may be utilized through operation of lever 66 to hold the clutch collar in the neutral position, against the force of the centrifugal governor, when it is desired, for instance to accelerate the engine without starting or speeding up the car.

The casing containing the pump and forward and reverse drive motor elements may be made up in substantially circular disc-like sections, as indicated at 76, 77, 78, 79, 80, 81 and 82, secured together by through bolts or other suitable fastenings 83, as particularly shown in Fig. 9, and which view also illustrates the ported tubular reversing valve 49.

Associated with each of the tubular control valves is a transfer tube or passage, 84 for the forward drive pump and motor couple and 85 for the reverse drive pump and motor couple.

These transfer tubes or passages are shown as having inward opening check valves 86 and 87 to automatically induct air or oil to keep the system filled.

In Figs. 1 and 2 the casing is shown as having an annular overstanding flange 88 at the induction valve end of the same for taking in a quantity of oil that may be contained in the surrounding housing 89, thus to enable these check valves to automatically take in such oil as and when it may be required.

In addition to the through port 90 in the forward drive control valve 44 by which liquid is passed through in a closed circuit from one side of the pump unit to the other for idling purposes, this tubular valve, as shown in Fig. 10, has a port 91 in the inner end of the same to register with a passage 92, Fig. 5, opening into the induction or supply chamber 93 connected by port 94 with the motor chamber 30 of the forward drive unit.

At the opposite side a discharge port 95 exhausts discharge fluid into a chamber 96 connected by return passage 97 with the transfer tube 84 which at its other end delivers the returning fluid at 98 into the intake side of the forward drive pump unit.

In similar fashion, the reverse control valve 49, in addition to a through port 99 at the front end, has a side port 100 at the inner end to register with a passage 101, Fig. 6, opening into supply chamber 102 ported at 103 to deliver in a reversing direction into the chamber 32 of the reverse drive motor unit.

Flow from the opposite side of the reverse drive motor unit 32, Fig. 6, is by way of port 104 into exhaust chamber 105 connected by passage 106 with the inner end of transfer tube 85 which is connected by passage 107 at the opposite end with the intake stream of the reverse drive pump unit 28.

In the diagrammatic views, Fig. 11 represents the idling or neutral position with the forward control valve 44 in the full open position passing liquid from the forward drive pump unit in a closed circuit about and through that pump unit.

At such time, that is in the neutral position, the reverse control valve 49 of the reverse drive unit will be in the full open position, as shown in Fig. 12, with all the liquid pumped by that unit passing in a closed circuit through and about the same.

In the forward drive position of the parts the control valve 44 is turned first to partially and then to completely close off the by-passing circuit, as indicated in Fig. 13, in which case first part and then all the oil is pumped back through the tubular valve 44 and out the port 91 to the inlet side of the forward drive motor unit and discharging from that unit into the inner end of the transfer tube 84 and forward in that tube and out at 98 into the inlet side of the forward drive pump unit.

The reverse drive circuit is diagrammatically shown in Fig. 14, wherein it will be seen that as the tubular valve 49 is turned in the closing direction to shut off the by-pass flow, the liquid will be diverted back through this valve and out through port 100 into the operating chamber 32 of the reverse drive motor and pass from there into transfer tube 85 and back at 107 into the return side of the reverse pump at 28.

To effect a desirable gear reduction relation between pump and motor units, the pump units, as indicated in Fig. 2, may be of smaller displacement than the motor units, for example in a three-to-one ratio, so that starting either forward or reverse will be with a desirable advantage in gear ratio. As speed picks up the motor unit may eventually operate at the same speed as the power shaft, thus to effect a direct drive relation and as such relation is reached or approached the entire casing, in forward drive, may rotate as a unit with the driving and driven shafts.

By reducing power the clutch cone 58 may be shifted by the centrifugal governor 60 to a lower speed drive relation, thus to utilize the braking power of the engine.

While automatic control through the medium of a centrifugal governor has been disclosed, it is contemplated that arbitrary control may be substituted. In the immediate illustration it may be considered that arbitrary control is initially provided as through manual adjustment of the carburetor or fuel supply to the engine. In place of such manual adjustment of power utilized this may be governed automatically as for purposes of maintaining constant speed or preventing over speeding.

While considered particularly desirable for automobile drive purposes, it will be realized that the invention has special advantages for many other purposes such as for powering aircraft, ships, trains, or the like.

Made up in sections as disclosed, the casing and internal parts can be produced and assembled at reasonable cost. This unit can be absolutely balanced so as to operate smoothly and efficiently to serve in a fly-wheel capacity in the forward drive operating condition. The invention thus provides the full service of clutch, flywheel, variable speed forward and reverse drive transmission with infinitely variable automatic acceleration in forward drive.

To maintain a body of supply oil in the housing, an oil pump may be utilized having a connection delivering into the housing at 108, Fig. 1.

*Operation*

In forward drive operation fluid circulated by reverse drive pump impeller 29 is by-passed in an idle circuit about that pump, as shown in Fig. 12, and in reverse drive operation this idle by-passing of fluid is effected by the forward drive pump, as indicated in Fig. 11.

Specifically this is accomplished by turning valve 49, as shown in Fig. 4, to line up the cross port 99, Fig. 10, with passage 107 connecting the by-pass chamber surrounding pump chamber 28 so that fluid will pass out of this chamber at one side and through passage 107 back into the pump chamber at the opposite side, all as diagrammatically indicated in Fig. 12. With the reverse drive pump thus operating idly, the forward drive pump is free to circulate fluid in the forward drive pressure circuit indicated in Fig. 13, valve 44 at that time being turned to partially or entirely prevent the idle flow through by-pass 43, Fig. 3, and to compel pressure fluid admitted by port 90 to flow back through the tubular valve and out the port 91 into the chamber of the forward drive motor and against the impeller 31 in the latter, and then from this chamber into the back end of tubular member 84, Fig. 13, forwardly through that member into the induction side of the forward drive pump.

Thus with the forward drive pump and motor connected in the operating circuit shown in Fig. 13, and the reverse drive pump operating idly as in Fig. 12, the forward drive will be effective.

With the casing held against rotation by the securing slide 71, Fig. 2, and the forward drive motor operating idly as shown in Fig. 11, the reverse drive pump will transmit fluid under pressure in the circuit shown in Fig. 14, in such case the valve 49 being turned to partially or wholly cut off the by-pass circuit and to compel pressure fluid admitted through port 99, Fig. 10, to flow back through this tubular valve and out through port 100 into the reverse motor chamber against impeller 33, and then from that chamber through tubular conductor 85 forwardly into the low pressure side of the reverse pump.

What is claimed is:

1. A transmission of the character disclosed for coaxial driving and driven shafts, comprising a casing concentrically rotatable about said shafts and companion forward and reverse drive pump chambers in the section over the drive shaft and forward and reverse drive motor chambers in the section over the driven shaft, hydraulic fluid impellers fixed on the drive shaft within said forward and reverse drive pump chambers, impellers fixed on the driven shaft within said forward and reverse drive motor chambers and controllable fluid passages in said casing from said forward drive pump chamber to said forward drive motor chamber and from said reverse drive pump chamber to said reverse drive motor chamber, respectively.

2. A transmission of the character disclosed for coaxial driving and driven shafts, comprising a casing concentrically rotatable about said shafts and companion forward and reverse drive pump chambers in the section over the drive shaft and forward and reverse drive motor chambers in the section over the driven shaft, hydraulic fluid impellers fixed on the drive shaft within said forward and reverse drive pump chambers, impellers fixed on the driven shaft within said forward and reverse drive motor chambers and controllable fluid passages in said casing from said forward drive pump chamber to said forward drive motor chamber and from said reverse drive pump chamber to said reverse drive motor chamber, respectively, the units constituting said forward and reverse drive pump units being smaller than the units constituting said forward and reverse drive motor units to introduce a gear reduction ratio between said pump and motor units.

3. A transmission of the character disclosed for coaxial driving and driven shafts, comprising a casing concentrically rotatable about said shafts and companion forward and reverse drive pump chambers in the section over the drive shaft and forward and reverse drive motor chambers in the section over the driven shaft, hydraulic fluid impellers fixed on the drive shaft within said forward and reverse drive pump chambers, impellers fixed on the driven shaft within said forward and reverse drive motor chambers and controllable fluid passages in said casing from said forward drive pump chamber to said forward drive motor chamber and from said reverse drive pump chamber to said reverse drive motor chamber, respectively, including ported, rotatively adjusted tubular valves journaled in the casing and extending from said pump units on the drive shaft to said motor units on the driven shaft.

4. A transmission of the character disclosed for coaxial driving and driven shafts, comprising a casing concentrically rotatable about said shafts and companion forward and reverse drive pump chambers in the section over the drive shaft and forward and reverse drive motor chambers in the section over the driven shaft, hydraulic fluid impellers fixed on the drive shaft within said forward and reverse drive pump chambers, impellers fixed on the driven shaft within said forward and reverse drive motor chambers and controllable fluid passages in said casing from said forward drive pump chamber to said forward drive motor chamber and from said reverse drive pump chamber to said reverse drive motor chamber, respectively, automatic means governing operation of said pump units according to drive shaft speed and means for arbitrarily controlling said pump units independently of drive shaft speed.

5. A transmission of the character disclosed for coaxial driving and driven shafts, comprising a casing concentrically rotatable about said shafts and companion forward and reverse drive pump chambers in the section over the drive shaft and forward and reverse drive motor chambers in the section over the driven shaft, hydraulic fluid impellers fixed on the drive shaft within said forward and reverse drive pump chambers, impellers fixed on the driven shaft within said forward and reverse drive motor chambers and controllable fluid passages in said casing from said forward drive pump chamber to said forward drive motor chamber and from said reverse drive pump chamber to said reverse drive motor chamber, respectively, including ported, rotatively adjusted tubular valves journaled in the casing and extending from said pump units on the drive shaft to said motor units on the driven shaft, and means for effecting automatic adjustment of said valves according to speed of the drive shaft.

6. A transmission of the character disclosed for coaxial driving and driven shafts, comprising a casing concentrically rotatable about said shafts and companion forward and reverse drive pump chambers in the section over the drive shaft and forward and reverse drive motor chambers in the section over the driven shaft, hydraulic fluid impellers fixed on the drive shaft within said forward and reverse drive pump chambers, impellers fixed on the driven shaft within said forward and reverse drive motor chambers and controllable fluid passages in said casing from said forward drive pump chamber to said forward drive motor chamber and from said reverse drive pump chamber to said reverse drive motor chamber, respectively, including ported, rotatively adjusted tubular valves journaled in the casing and extending from said pump units on the drive shaft to said motor units on the driven shaft, means for effecting automatic adjustment of said valves according to speed of the drive shaft and means for arbitrarily overcoming said automatic control to effect arbitrary adjustment of said control valves.

7. A transmission of the character disclosed for coaxial driving and driven shafts, comprising a casing concentrically rotatable about said shafts and companion forward and reverse drive pump chambers in the section over the drive shaft and forward and reverse drive motor chambers in the section over the driven shaft, hydraulic fluid impellers fixed on the drive shaft within said forward and reverse drive pump chambers, impellers fixed on the driven shaft within said forward and reverse drive motor chambers and controllable fluid passages in said casing from said forward drive pump chamber to said forward drive motor chamber and from said reverse drive pump chamber to said reverse drive motor chamber, respectively, a centrifugal governor on the drive shaft and means actuated thereby for effecting control of said fluid passages.

8. A transmission of the character disclosed for coaxial driving and driven shafts, comprising a casing concentrically rotatable about said shafts and companion forward and reverse drive pump chambers in the section over the drive shaft and forward and reverse drive motor chambers in the section over the driven shaft, hydraulic fluid impellers fixed on the drive shaft within said forward and reverse drive pump chambers, impellers fixed on the driven shaft within said forward and reverse drive motor chambers and controllable fluid passages in said casing from said forward drive pump chamber to said forward drive motor chamber and from said reverse drive pump chamber to said reverse drive motor chamber, respectively, including ported, rotatively adjusted tubular valves journaled in the casing and extending from said pump units on the drive shaft to said motor units on the driven shaft and transfer passages forming part of a return flow circuit from the motor chambers back to the pump chambers and including intake check valves for keeping the fluid pumping systems filled.

9. A transmission of the character disclosed for coaxial driving and driven shafts, comprising a casing concentrically rotatable about said shafts and companion forward and reverse drive pump chambers in the section over the drive shaft and forward and reverse drive motor chambers in the section over the driven shaft, hydraulic fluid impellers fixed on the drive shaft within said forward and reverse drive pump chambers, impellers fixed on the driven shaft within said forward and reverse drive motor chambers and controllable fluid passages in said casing from said forward drive pump chamber to said forward drive motor chamber and from said reverse drive pump chamber to said reverse drive motor chamber, respectively, and controllable means for holding the casing against rotation on the shafts.

10. A transmission of the character disclosed for coaxial driving and driven shafts, comprising a casing concentrically rotatable about said shafts and companion forward and reverse drive pump chambers in the section over the drive shaft and forward and reverse drive motor chambers in the section over the driven shaft, hydraulic fluid impellers fixed on the drive shaft within said forward and reverse drive pump chambers, impellers fixed on the driven shaft within said forward and reverse drive motor chambers and controllable fluid passages in said casing from said forward drive pump chamber to said forward drive motor chamber and from said reverse drive pump chamber to said reverse drive motor chamber, respectively, including ported, rotatively adjusted tubular valves journaled in the casing and extending from said pump units on the drive shaft to said motor units on the driven shaft and controllable means for holding the casing against rotation on the shafts and for arbitrarily controlling adjustment of said valves.

11. A transmission of the character disclosed for coaxial driving and driven shafts, comprising a casing concentrically rotatable about said shafts and companion forward and reverse drive pump chambers in the section over the drive shaft and forward and reverse drive motor chambers in the section over the driven shaft, hydraulic fluid impellers fixed on the drive shaft within said forward and reverse drive pump chambers, impellers fixed on the driven shaft within said forward and reverse drive motor chambers and controllable fluid passages in said casing from said forward drive pump chamber to said forward drive motor chamber and from said reverse drive pump chamber to said reverse drive motor chamber, respectively, including ported, rotatively adjusted tubular valves journaled in the casing and extending from said pump units on the drive shaft to said motor units on the driven shaft, means external of the casing for effecting adjustment of said valves and a stepped collar shiftable on the drive shaft for effecting actuation of said valve adjusting means.

12. A transmission of the character disclosed for coaxial driving and driven shafts, comprising a casing concentrically rotatable about said shafts and companion forward and reverse drive pump chambers in the section over the drive shaft and forward and reverse drive motor chambers in the section over the driven shaft, hydraulic fluid impellers fixed on the drive shaft within said forward and reverse drive pump chambers, impellers fixed on the driven shaft within said forward and reverse drive motor chambers and controllable fluid passages in said casing from said forward drive pump chamber to said forward drive motor chamber and from said reverse drive pump chamber to said reverse drive motor chamber, respectively, including ported, rotatively adjusted tubular valves journaled in the casing and extending from said pump units on the drive shaft to said motor units on the driven shaft, means external of the casing for effecting adjustment of said valves and a stepped collar shiftable on the drive shaft for effecting actuation of said valve adjusting means and means for effecting adjustment of said stepped collar in opposite directions on said drive shaft.

13. A transmission of the character disclosed for coaxial driving and driven shafts, comprising a casing concentrically rotatable about said shafts and companion forward and reverse drive pump chambers in the section over the drive shaft and forward and reverse drive motor chambers in the section over the driven shaft, hydraulic fluid impellers fixed on the drive shaft within said forward and reverse drive pump chambers, impellers fixed on the driven shaft within said forward and reverse drive motor chambers and controllable fluid passages in said casing from said forward drive pump chamber to said forward drive motor chamber and from said reverse drive pump chamber to said reverse drive motor chamber, respectively, a movable stop engaged with the casing to hold the same against rotation and releasable means for securing said stop in a non-holding position.

14. A transmission of the character disclosed for coaxial driving and driven shafts, comprising a casing concentrically rotatable about said shafts and companion forward and reverse drive pump chambers in the section over the drive shaft and forward and reverse drive motor chambers in the section over the driven shaft, hydraulic fluid impellers fixed on the drive shaft within said forward and reverse drive pump chambers, impellers fixed on the driven shaft within said forward and reverse drive motor chambers and controllable fluid passages in said casing from said forward drive pump chamber to said forward drive motor chamber and from said reverse drive pump chamber to said reverse drive motor chamber, respectively, a movable stop for holding the casing against rotation, means for effecting arbitrary control of the pumping action and common means for effecting actuation of said stop and operation of said pump control means.

15. A transmission of the character disclosed for coaxial driving and driven shafts, comprising a casing concentrically rotatable about said shafts and companion forward and reverse drive pump chambers in the section over the drive shaft and forward and reverse drive motor chambers in the section over the driven shaft, hydraulic fluid impellers fixed on the drive shaft within said forward and reverse drive pump chambers, impellers fixed on the driven shaft within said forward and reverse drive motor chambers and controllable fluid passages in said casing from said forward drive pump chamber to said forward drive motor chamber and from said reverse drive pump chamber to said reverse drive motor chamber, respectively, said pump and motor impellers including rotors fixed on said shafts and sliding pistons operating transversely in said rotors, said casing having by-pass chambers about said pump and motor chambers and said control means including valves adjustable to control fluid passage into and out of said by-pass chambers.

16. A transmission of the character disclosed for coaxial driving and driven shafts, comprising a casing concentrically rotatable about said shafts and companion forward and reverse drive pump chambers in the section over the drive shaft and forward and reverse drive motor chambers in the section over the driven shaft, hydraulic fluid impellers fixed on the drive shaft within said forward and reverse drive pump chambers, impellers fixed on the driven shaft within said forward and reverse drive motor chambers and controllable fluid passages in said casing from said forward drive pump chamber to said forward drive motor chamber and from said reverse drive pump chamber to said reverse drive motor chamber, respectively, said casing having by-passes about the respective pump and motor chambers, valves controlling said by-passes and forming therewith part of the passages described and means for effecting adjustment of said valves.

17. A transmission of the character disclosed for coaxial driving and driven shafts, comprising a casing concentrically rotatable about said shafts and companion forward and reverse drive pump chambers in the section over the drive shaft and forward and reverse drive motor chambers in the section over the driven shaft, hydraulic fluid impellers fixed on the drive shaft within said forward and reverse drive pump chambers, impellers fixed on the driven shaft within said forward and reverse drive motor chambers and controllable fluid passages in said casing from said forward drive pump chamber to said forward drive motor chamber and from said reverse drive pump chamber to said reverse drive motor chamber, respectively, said pump and motor impellers including rotors fixed on said shafts and sliding pistons operating transversely in said rotors, said casing having by-pass chambers about said pump and motor chambers and said control means including valves adjustable to control fluid passage into and out of said by-pass chambers and cams in the pump and motor chambers controlling transverse sliding movement of said pistons and having tapered opposite ends with notches in the edges of the same providing ports into and out of the pump and motor chambers.

OTTO J. EISELE.

REFERENCES CITED

The following references are of record in the file of this patent:

UNITED STATES PATENTS

| Number | Name | Date |
|---|---|---|
| 1,057,251 | Manly | Mar. 25, 1913 |
| 1,080,282 | Kellogg | Dec. 2, 1913 |
| 1,545,678 | Miller | July 14, 1925 |
| 1,603,179 | Wingquist | Oct. 12, 1926 |
| 2,199,081 | Perin | Apr. 30, 1940 |
| 2,337,499 | Roth | Dec. 21, 1943 |